US008650173B2

(12) United States Patent
McDonald et al.

(10) Patent No.: US 8,650,173 B2
(45) Date of Patent: Feb. 11, 2014

(54) PLACEMENT OF SEARCH RESULTS USING USER INTENT

(75) Inventors: Kieran Richard McDonald, Seattle, WA (US); Ran Gilad-Bachrach, Bellevue, WA (US); Nipoon Malhotra, Redmond, WA (US); Nitin Agrawal, Redmond, WA (US); Sanaz Ahari, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 134 days.

(21) Appl. No.: 12/821,134

(22) Filed: Jun. 23, 2010

(65) Prior Publication Data

US 2011/0320440 A1   Dec. 29, 2011

(51) Int. Cl.
 *G06F 7/00* (2006.01)
(52) U.S. Cl.
 USPC .......................................................... 707/706
(58) Field of Classification Search
 USPC ................................. 707/706, 712
 See application file for complete search history.

(56) References Cited

U.S. PATENT DOCUMENTS

| 6,675,159 | B1 | 1/2004 | Lin et al. |
| 7,552,112 | B2 | 6/2009 | Jhala et al. |
| 7,668,748 | B1 | 2/2010 | Veach |
| 7,698,270 | B2 | 4/2010 | Brave et al. |
| 2006/0064411 | A1 | 3/2006 | Gross et al. |
| 2007/0027864 | A1 | 2/2007 | Collins et al. |
| 2007/0162442 | A1 | 7/2007 | Brill |
| 2007/0214131 | A1 | 9/2007 | Cucerzan |
| 2007/0294225 | A1 | 12/2007 | Radlinski et al. |
| 2007/0294240 | A1 | 12/2007 | Steele et al. |
| 2008/0114759 | A1* | 5/2008 | Yahia et al. ....................... 707/6 |
| 2008/0120276 | A1 | 5/2008 | Chennavasin |
| 2008/0154877 | A1 | 6/2008 | Joshi |
| 2008/0201304 | A1 | 8/2008 | Sue |
| 2008/0313178 | A1 | 12/2008 | Bates |
| 2009/0063462 | A1 | 3/2009 | Alfonseca et al. |
| 2009/0164895 | A1 | 6/2009 | Baeza-Yates et al. |
| 2009/0177959 | A1 | 7/2009 | Chakrabarti et al. |
| 2009/0228439 | A1 | 9/2009 | Manolescu et al. |
| 2010/0161643 | A1 | 6/2010 | Gionis et al. |
| 2011/0208715 | A1* | 8/2011 | Ni et al. ........................ 707/709 |

OTHER PUBLICATIONS

Yoon, et al., "Intent-Based Categorization of Search Results Using Questions from Web Q&A Corpus", Retrieved at << http://www.springerlink.com/content/y574g66h56148u45/fulltext.pdf >>, Lecture Notes in Computer Science, Proceedings of the 10th International Conference on Web Information Systems Engineering, vol. 5802, Oct. 5-7, 2009, pp. 145-158.

(Continued)

*Primary Examiner* — Truong Vo
(74) *Attorney, Agent, or Firm* — Dave Ream; Doug Barker; Micky Minhas (57) ABSTRACT

Technologies are described herein for placing search results on a search engine results page (SERP). A query may be received. The query may be transmitted to a plurality of search result providers. A first set of search results and a second set of search results may be received from the search result providers. Intent features may be extracted from the first set of search results. User intent of the second set of search results may be inferred based on the extracted intent features. The first set of search results and the second set of search results may be ranked based on the inferred user intent. The SERP may be rendered according to the ranked first set and second set of search results.

17 Claims, 5 Drawing Sheets

(56) References Cited

OTHER PUBLICATIONS

Jenkins, J R., "Federated Search: Results Clustering", Retrieved at << http://smartech.gatech.edu/bitstream/1853/13650/1/233-sat-11_05.pdf >>, Feb. 24, 2007, pp. 40.

"A Federated Search Primer—Part II of III", Retrieved at << http://www.altsearchengines.com/2009/01/12/a-federated-search-primer-part-ii-of-iii/ >>, Jan. 12, 2009, pp. 5.

"Search Engine Optimization (SEO)", Retrieved at << http://www.bruceclay.com/web_rank.htm >>, Retrieved Date: Apr. 19, 2010, pp. 11.

Mooney, Raymond., "Using Markov Logic Networks to Infer User Intent for Search Queries", Retrieved at << http://research.microsoft.com/en-us/um/redmond/about/collaboration/awards/beyondsearchawards.aspx#EZE >>, Retrieved Date: Apr. 19, 2010, pp. 5.

Jiang et al., "AIDE: Ad-hoc intents detection engine over query logs," Jun. 29-Jul. 3, 2009, *SIGMOND '09,* Providence, Rhode Island, pp. 1091-1093.

Lee et al., "Automatic identification of user goals in web search," May 10-14, 2005, *WWW 2005,* Chiba, Japan, pp. 391-400.

Nguyen et al., "Functional faceted web query analysis," May 8-12, 2007, *WWW 2007,* Baniff, Canada, 8 pages.

Poblete et al., "Query-sets: Using implicit feedback and query patterns to organize web documents," Apr. 21-25, 2008, *WWW 2008,* Beijing, China, pp. 41-50.

Welch et al., "Automatically identifying localizable queries," Jul. 2-24, 2008, *SIGIR '08,* Singapore, pp. 507-514.

U.S. Official Action dated Mar. 29, 2012 in U.S. Appl. No. 12/710,973.

U.S. Official Action dated Jul. 12, 2012 in U.S. Appl. No. 12/710,973.

U.S. Official Action dated Dec. 20, 2012 in U.S. Appl. No. 12/710,973.

U.S. Official Action dated Apr. 11, 2013 in U.S. Appl. No. 12/710,973.

* cited by examiner

PLACEMENT OF SEARCH RESULTS USING USER INTENT

BACKGROUND

Generally, a search application (commonly referred to as search engine) is designed to retrieve search results from one or more databases based on a query containing one or more search terms. The search results may include hyperlinks ("links") to relevant World Wide Web ("web") pages. The search results may also include other relevant information, such as news articles, images, videos, and the like. The search engine may display at least a portion of the search results on a search engine results page ("SERP").

The number of search results that can be arranged on the SERP is usually limited by the size of a standard display. As a result, the selection, sizing, and placement of the search results on the SERP can significantly affect user experience. One factor for determining the selection, sizing, and placement of search results is the intent of the user submitting the query. Conventional approaches for determining the intent of the user rely primarily on analyzing the search query. For example, a search query for "weather in NYC" may indicate to the search application that the user is interested in a weather forecast for New York City. However, in some instances, the search query may not clearly indicate the intent of the user. For example, a search query for "enterprise" provides no explicit indication of user intent, although the user may be interested in car rentals from the ENTERPRISE RENT-A-CAR company or the starship from the fictional STAR TREK television series.

It is with respect to these considerations and others that the disclosure made herein is presented.

SUMMARY

Technologies are described herein for placing search results on a SERP. Through the utilization of the technologies and concepts presented herein, a search application may be configured to utilize search results of some information type (e.g., web page results) from one search result provider in order to infer relevancy of search results of some other information type (e.g., images, videos, commerce, etc.) from other search result providers. When a user submits a query to the search application, the search application may forward the query to one or more search result providers. In response to receiving the query, the search result providers may transmit search results that satisfy the query to the search application.

The search results may include a first set of search results having one or more information types and a second set of search results having one or more other information types. When the search application receives the search results, the search application may extract intent features from the first set of search results that can be utilized to infer intent. The search application may infer the relevancy of the second set of search results based on the extracted intent features. The search application may rank the search results based, at least in part, on the inferred relevancy of the second set of search results. A search application may select, size, and place at least a portion of the search results on a SERP according to the ranked search results.

In an example technology, a computer having a memory and a processor is configured to place search results on a SERP. The computer may receive a query. The computer may transmit the query to a plurality of search result providers. Upon transmitting the query to the plurality of search result providers, the computer may receive a first set of search results and a second set of search results. The computer may extract intent features from the first set of search results. The computer may infer user intent based on the extracted intent features. The computer may rank the first set of search results and the second set of search results based on the inferred user intent. The computer may render the SERP according to the ranked first set and second set of search results.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for placing search results on a SERP. In accordance with some embodiments described herein, a search application may be configured to utilize search results of some information type from one search result provider in order to infer relevancy of search results of some other information type from other search result providers. For example, the search application may receive a query. When the search application forwards the query to search result providers, one search result provider may provide web page results that satisfy the query, and another search result provider may provide videos that satisfy the query.

In this example, the web page results may include a relatively high number of links to video related websites, such as the YOUTUBE video sharing web site. As a result, the search application may infer user intent to view video, even though the query may not explicitly mention the term "video," "movie," "clip," or the like. Based on the inferred user intent, the search application may highly rank the videos with respect to the web page results and other search results based on the inferred user intent. As a result, the search application may render a SERP such that the videos are sized and placed in a prominent manner on the SERP (e.g., at the top of the SERP).

The technologies described herein for ranking search results are query independent. That is, the technologies may infer user intent based on search results regardless of the content of the query. As a result, the technologies described herein may provide improved search results for new queries and tail queries (i.e., less frequent queries) over conventional, query dependent ranking functions. In particular, new queries and tail queries may have very little, if any, historical ranking data available. For example, very little, if any, historical data may be available for a query that contains a proper name of someone relatively unknown. However, some of the search results satisfying the query may provide helpful information for inferring user intent with respect to other search results.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
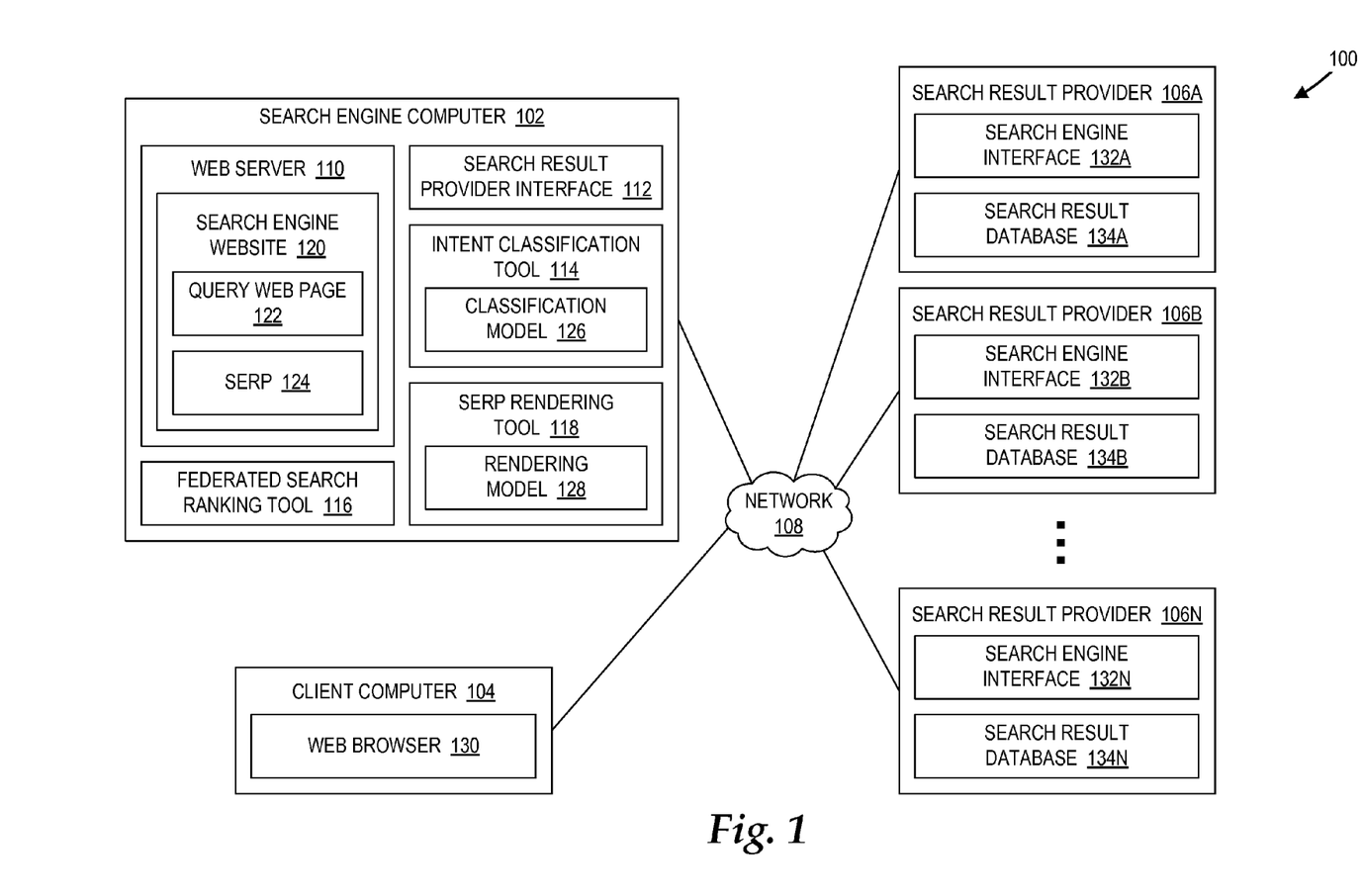
FIG. 1 is a network architecture diagram illustrating aspects of several networked computing systems that are configured to place search results on a SERP, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, a computing system and methodology for placing search results on a SERP will be described. In particular, FIG. 1 illustrates an example computer network architecture 100 configured to place search results on a SERP, in accordance with some embodiments. The computer network architecture 100 includes a search engine computer 102, a client computer 104, a first search result provider 106A, a second search result provider 106B, and an Nth search result provider 106N. The search result providers 106A-106N may be collectively referred to as search result providers 106. The search engine computer 102, the client computer 104, and the search result providers 106 may be communicatively coupled via a network 108.

The search engine computer 102 may include a web server 110, a search result provider interface 112, an intent classification tool 114, a federated search ranking tool 116, and a SERP rendering tool 118. The web server 110 may include a search engine website 120. The search engine website 120 may include a query web page 122 and a SERP 124. The intent classification tool 114 may include a classification model 126. The SERP rendering tool 118 may include a rendering model 128.

The client computer 104 may include a web browser 130. Each of the search result providers 106 may include a corresponding search engine interface 132A-132N and a corresponding search result database 134A-134N. The search engine interfaces 132A-132N may be collectively referred to as search engine interfaces 132. The search result databases 134A-134N may be collectively referred to as search result databases 134.

A user may utilize the web browser 130 to access the search engine website 120 through the web server 110. For example, the user may enter a uniform resource locator ("URL") corresponding to the search engine website 120 into the web browser 130. When the user submits the URL through the web browser 130, the search engine website 120 may provide the query web page 122. The query web page 122 may be configured to provide an interface whereby the user can submit a query containing one or more search terms. When the user submits the query through the query web page 122, the search result provider interface 112 may forward the query to one or more of the search result providers 106. The search engine interfaces 132 may receive the query from the search result provider interface 112. The search engine interfaces 132 may then retrieve search results satisfying the query from the search result databases 134.

In some embodiments, each the search result databases 134 are configured to provide search results corresponding to one or more information types. Examples of information types may include, but are not limited to, web page results, maps, news articles, videos, images, commerce related information (e.g., products, stores, etc.), stock quotes, and local search information (e.g., nearby restaurants, nearby hotels, etc.). It should be appreciated that various techniques for retrieving search results that satisfy a query are well known in the art. As such, these techniques are not described in further detail in the present disclosure.

When the search engine interfaces 132 retrieve relevant search results from the search result databases 134, the search engine interfaces 132 may transmit the relevant search results to the search result provider interface 112. The relevant search results may include multiple information types from the various search result providers 106. In order to rank the importance of the multiple information types, the search engine computer 102 may implement the intent classification tool 114.

The intent classification tool 114 may be configured to infer user intent. In particular, the intent classification tool 114 may utilize a first set of search results from at least one search result provider, such as the first search result provider 106A, in order to infer a relevancy of a second set of search results from other search result providers, such as the search result providers 106B-106N. It should be appreciated that any of the search result providers 106 may be utilized to infer a relevancy of the other search result providers 106. For example, the first search result provider 106A may provide web page results corresponding to a query. The search result providers 106B-106N may provide maps, news articles, videos, images, and the like corresponding to the same query. The intent classification tool 114 may infer the relevancy of the maps, the news articles, the videos, and the images based on the web page results.

The intent classification tool 114 may extract intent features corresponding to a first set of search results from at least one search result provider, such as the first search result provider 106A. The intent classification tool 114 may generate user intent values for various information types based on these extracted intent features. The intent classification tool 114 may then infer a relevancy of a second set of search results from other search result providers, such as the search result providers 106B-106N, based on these intent values.

As used herein, the term "intent features" may refer to attributes of the first set of search results that correlate to specific user intent. As used herein, the term "intent values" may refer to indications as to whether particular information types are relevant. In some embodiments, the intent values may include binary values in which each information type is simply relevant or not relevant to a given query. In some other embodiments, the values may include ranges signifying that each information type has varying levels of relevance to a given query. As used herein, the term "user intent" may refer to a relevancy of one or more information types corresponding to the second set of search results.

Features may include text contained in the search results. For example, a search result may include a URL, a title of content contained at the URL, a snippet (i.e., a short description of the content contained at the URL), and/or other metadata. The intent classification tool 114 may analyze the text contained in the search results in order to identify suggestions towards a given information type. For example, an illustrative URL may end in "images/abc.jpg." In this example, the directory name "images" and the file extension ".jpg" may suggest user intent to view images. When analyzing text, the intent classification tool 114 may analyze single words as well as phrases containing two or more words. For example, the term "network" may convey an entirely different meaning than the term "network adapter."

Features may also include correlations and/or anti-correlations between the search results and user related information. For example, a user may enter a query "ACME BICYCLES." The intent classification tool 114 may be aware of the user's location based on a user profile associated with the user or a reverse Internet Protocol ("IP") lookup of the user's IP address. The search results may include a map showing a location of an ACME BICYCLES as a point of interest. In this case, the intent classification tool 114 may determine a distance between the user's location and the location of ACME BICYCLES on the map. If the distance is less than a specified threshold, then the intent classification tool 114 may infer that the user is interested in information about the particular ACME BICYCLES shown in the map, as opposed to another ACME BICYCLES in another town.

Features may further include similarities and/or differences between search results from different search result providers 106. The similarities may include names, addresses, phone numbers, and/or the like. For example, search results from the first search result provider 106A may provide web page results that include a name of a restaurant. In addition, search results from the second search result provider 106B may provide a map that shows the name and location of the same restaurant. In this case, the intent classification tool 114 may infer that the user is interested in information about the particular restaurant shared in both the web page results and the map results.

Features may additionally include information known about the websites corresponding to the URLs in the search results. In one example, a URL corresponding to a video sharing website, such as YOUTUBE, may suggest user intent to view videos. In another example, a URL corresponding to a news provider, such as THE NEW YORK TIMES, may suggest user intent to view news articles. In yet another example, a URL corresponding to a hotel, such as HILTON, may suggest user intent to reserve a hotel room. In each of these examples, the query itself may not contain search terms explicitly indicating that the user is searching for videos, news articles, or hotels. However, the intent classification tool 114 may utilize information known about the websites corresponding to the URLs to infer such user intent.

In some embodiments, the intent classification tool 114 may infer user intent from search results according to the classification model 126. For example, technologies may utilize suitable machine learning techniques, such as support vector machines ("SVMs"), to generate statistical and logical rules based on a set of training examples (e.g., search results associated with known relevant information types, search results associated with known irrelevant information types, etc.). These statistical and logical rules may form the classification model 126. Once the classification model has been generated, the intent classification tool 114 may utilize the classification model 126 to infer the relevancy of information types for future search results. The classification model 126 may be continuously and automatically updated with new training examples.

In some other embodiments, the intent classification tool 114 may identify the information types based on the fixed set of rules. For example, each rule may contain one or more conditional statements associated with intent features for determining the relevancy of particular information type. If a given search result satisfies a conditional statement, then the intent classification tool 114 may determine that the corresponding information type is relevant or not relevant. However, altering existing rules, adding new rules, and/or deleting outdated rules can become tedious and time-consuming and may rely on significant technical expertise. By generating and updating the classification model through training examples, a search engine developer does not have to continuously and manually manage and update the fixed set of rules. Further, by generating and updating the classification model through training examples, the search engine developer also does not have to explicitly identify the intent features which are utilized to create the rules.

The intent classification tool 114 may classify user intent by determining an intent value to each information type. As previously described, the intent values may include binary values in which corresponding information types are simply relevant or not relevant to a given query. In addition or alternatively, the intent values may include ranges signifying that the corresponding information types have varying levels of relevance to a given query. The intent classification tool 114 may utilize any suitable criteria for determining the intent value of each information type. When the intent classification tool 114 determines the intent values of information types for a specified number of search results, the intent classification tool 114 may forward the intent values to the federated search ranking tool 116.

The federated search ranking tool 116 may be configured to rank search results satisfying the query based, at least in part, on the intent values. Each intent value may correspond to an information type of the other search results. In this way, the federated search ranking tool 116 can determine more relevant search results based on the intent values. For example, if a corresponding intent values suggest that images are relevant to a given query, then the federated search ranking tool 116 may associate a higher rank for images that satisfy the given query.

The federated search ranking tool 116 may enhance other ranking functions with the intent values. For example, an illustrative ranking function may analyze the query in order to infer user intent. Another illustrative ranking function may assign confidence scores to search results based on suitable criteria. By combining the intent values with other ranking functions, the federated search ranking tool 116 can provide the most relevant search results to the user.

In some embodiments, the federated search ranking tool 116 may also compare features and information between search results in order to validate correlations and/or anti-correlations between the search results. For example, if a singer named John Doe passes away, fan pages for John Doe may not be immediately updated with information of John Doe's passing. However, news article results may show that that the singer John Doe has passed away. In this example, the federated search ranking tool 116 may compare the information on the John Doe in the fan pages with the John Doe in the news articles to validate that the same person is described. In this way, the federated search ranking tool 116 may assign a higher ranking to search results that describe the singer John Doe and a lower ranking to search results that describe, for example, a politician John Doe. When the federated search ranking tool 116 ranks the other search results based, at least in part, on the intent values, the federated search ranking tool 116 may provide the ranked search results to the SERP rendering tool 118.

The SERP rendering tool 118 may be configured to render the SERP 124 containing at least a portion of the ranked search results. The SERP rendering tool 118 may select and place the ranked search results on the SERP 124 according to the rendering model 128. The SERP 124 may include various regions for displaying search results. The SERP rendering tool 118 may display search results in different regions based on the rankings of the search results. For example, the SERP 124 may include a top region, a middle region, and a lower region. The SERP rendering tool 118 may insert the highest ranked search results in the top region such that when a user views the SERP 124, the user first views the highest ranked search results. In this case, the SERP rendering tool 118 may insert lower ranked search results in the middle region and the lower region. It should be appreciated that any suitable criteria may be utilized for determining the regions in which to insert certain search results.

In addition to determining the selection and placement of the search results on the SERP 124, the SERP rendering tool 118 may also determine the size and/or quantity of search results according to the rendering model 128. Higher ranked search results may be displayed more prominently on the SERP 124. For example, higher ranked search results may be displayed in a larger size or larger font. In other embodiments, the SERP rendering tool 118 may also insert relevant advertisements into the SERP 124. When the SERP rendering tool renders the SERP 124, the web server 110 may display the SERP 124.

Figure 2:
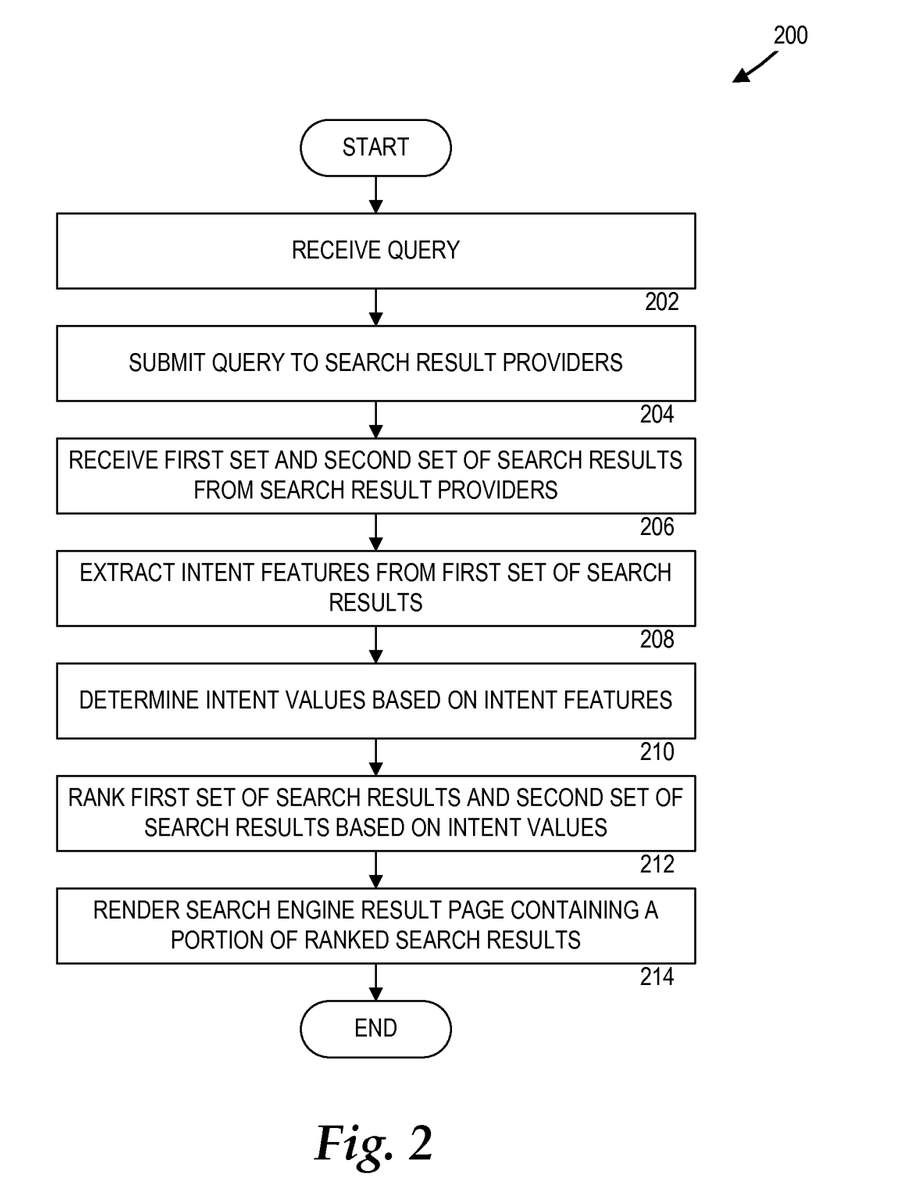
FIG. 2 is a flow diagram illustrating a method for placing search results on the SERP, in accordance with some embodiments.

Referring now to FIG. 2, additional details regarding the operation of the search engine computer 102 will be described. In particular, FIG. 2 is a flow diagram illustrating a method for placing search results on the SERP 124, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 2, a routine 200 begins at operation 202, where the search engine computer 102 receives a query containing one or more search terms through the query web page 122. The routine 200 then proceeds to operation 204, where the search result provider interface 112 transmits the query to one or more of the search result providers 106. The search result providers 106 may provide search results having various information types. In some embodiments, search results having one or more information types may be utilized to infer user intent for other search results having other information types. For clarity of illustration, the search results having information types that are used to infer user intent are referred to as a first set of search results. The search results having information types that are ranked based, at least in part, on the inferred user intent, may be referred to as a second set of search results. When the search result provider interface 112 transmits the query to the search result providers 106, the routine 200 proceeds to operation 206.

At operation 206, the search result provider interface 112 receives the first set of search results and the second set of search results from the search result providers 106. The search result provider interface 112 may forward the first set of search results to the intent classification tool 114. The routine 200 then proceeds to operation 208, where the intent classification tool 114 extracts intent features from the first set of search results. As previously described, the intent features may include text contained in the first set of search results and correlations and/or anti-correlations between the first set of search results and user related information. The intent features may further include similarities and/or differences between the first set of search results from different search result providers 106 and information known about the websites corresponding to the URLs in the first set of search results. When the intent classification tool 114 extracts the intent features from the first set of search results, the routine 200 proceeds to operation 210.

At operation 210, the intent classification tool 114 determines intent values for various information types based on the intent features. The intent values may indicate whether search results having a particular information type are relevant to the query. The intent classification tool 114 may provide the intent values to the federated search ranking tool 116. The routine 200 may proceed to operation 212, where the federated search ranking tool 116 ranks the first set of search results and the second set of search results based, at least in part, on the intent values. For example, the federated search ranking tool 116 may assign a higher rank to search results deemed more relevant according to the corresponding intent values and a lower rank to search results deemed less relevant according to the corresponding intent values. The federated search ranking tool 116 may utilize the intent values to enhance other ranking functions, such as ranking functions that are query-dependent. The federated search ranking tool 116 may provide the ranked search results to the SERP rendering tool 118. When the federated search ranking tool 116 ranks the first set of search results and the second set of search results based, at least in part, on the intent values, the routine 200 proceeds to operation 214.

At operation 214, the SERP rendering tool 118 renders the SERP 124 to include at least a portion of the ranked search results. In particular, the SERP rendering tool 118 may select, size, and place the relevant search results in accordance with the ranking. When the SERP rendering tool 118 renders the SERP 124, the web server 110 may display the SERP 124.

Figure 3:
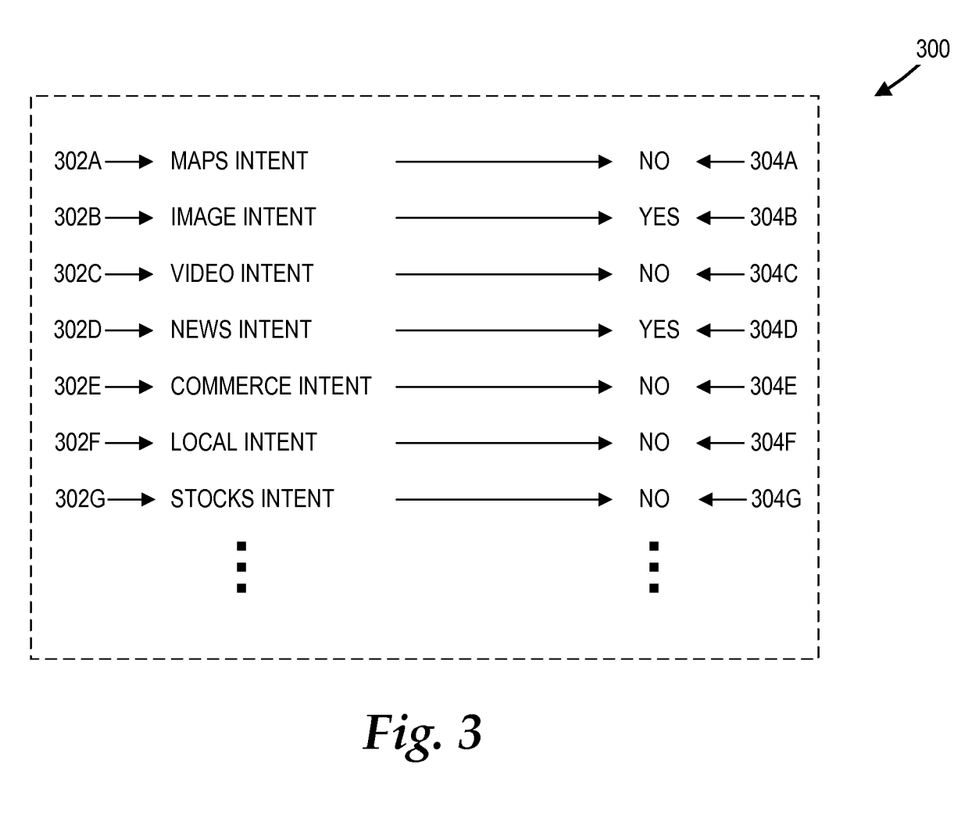
FIG. 3 is a data structure diagram illustrating a data structure utilized to store data showing user intent, in accordance with some embodiments.

Referring now to FIG. 3, additional details regarding the intent values will be described. In particular, FIG. 3 illustrates an example data structure 300 for storing data indicating user intent for a given query. The data structure 300 may include a plurality of information types 302A-302G. Each of the information types 302A-302G may correspond to one of a plurality of intent values 304A-304G. In the example illustrated in FIG. 3, the intent values 304A-304G include binary values that indicate whether the corresponding information type is relevant or not relevant to the query. In other embodiments, the values may include ranges indicating a level of relevance between the corresponding information type and the query.

Figure 4:
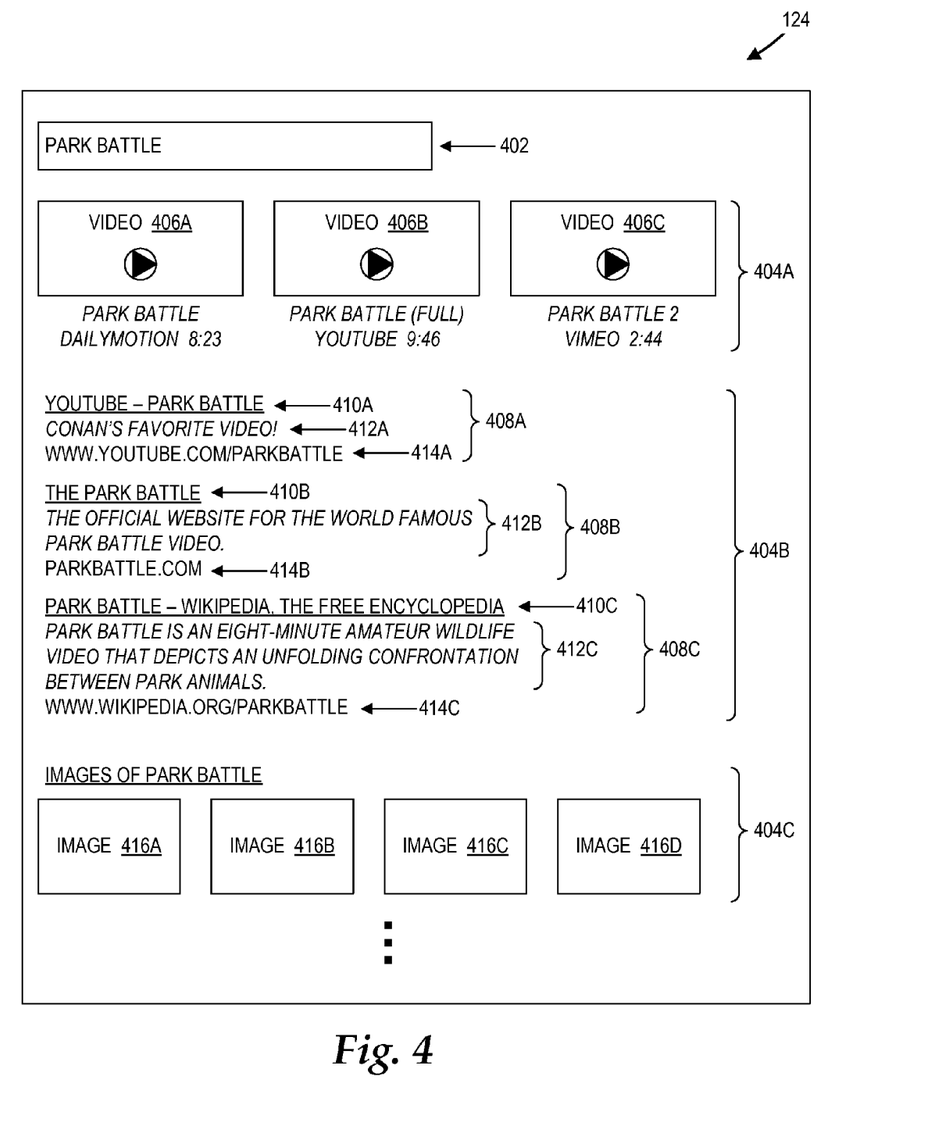
FIG. 4 is a screen display diagram illustrating an implementation of a SERP, in accordance with some embodiments.

Referring now to FIG. 4, additional details regarding the SERP 124 will be described. In particular, FIG. 4 illustrates a screen display diagram showing an example implementation of the SERP 124. The SERP 124 may include a text box 402 showing a user-submitted query, "park battle." The SERP 124 may include a top region 404A, a middle region 404B, and a bottom region 404C. The regions 404A-404C may be collectively referred to as regions 404. The top region 404A may include a first video 406A, a second video 406B, and a third video 406C. The videos 406A-406C may be collectively referred to as videos 406. The middle region 404B may include a web page result 408A, a second web page result 408B, and a third web page result 408C. The web page results 408A-408C may be collectively referred to as web page results 408.

Each of the web page results 408 may include a clickable link 410A-410C showing a title of the linked web page, a snippet 412A-412C, and a URL 414A-414C. The clickable links 410A-410C may be collectively referred to as clickable link 410. The snippets 412A-412C may be collectively referred to as snippets 412. The URLs 414A-414C may be collectively referred to as URLs 414. The bottom region 404C may include a first image 416A, a second image 416B, a third image 416C, and a fourth image 416D. The images 416A-416D may be collectively referred to as images 416. It should be appreciated that the top region 404A, the middle region 404B, and the bottom region 404C are merely illustrative regions, and the SERP 124 may be divided into other regions. Further, each of the regions 404 may include other information types that are not illustrated in FIG. 4.

In an illustrative example, the query "park battle" may refer to a popular, viral video on the Internet. When the user enters the query "park battle" through the query web page 122, the search result provider interface 112 may transmit the query "park battle" to the search result providers 106. In this example, the first search result provider 106A may return web page results, including the web page results 408, satisfying the query. The second search result provider 106B may return videos, including the videos 406, satisfying the query. The Nth search result provider 106N may return images, including the images 416, satisfying the query.

According to some embodiments, the intent classification tool 114 may utilize the classification model 126 to analyze the web page results 408 in order to infer user intent with respect to the videos 406 and the images 416. As illustrated in FIG. 4, each of the snippets 412 include the term "video," which may be indicative of user intent to view video. Further, the first URL 414A is directed to the YOUTUBE video sharing website, which may be further indicative of user intent to video. As a result, the intent classification tool 114 may generate intent values indicating the relevance of videos with respect to the user's query "park battle."

The intent classification tool 114 may provide the intent values to the federated search ranking tool 116, which ranks the videos 406, the web page results 408, and the images 416. In this example, the federated search ranking tool 116 may rank the videos 406 higher than the web page results 408 and rank the web page results 408 higher than the images 416. As a result, the SERP rendering tool 118, when rendering the SERP 124, may place the videos 406 in the top region 404A, the web page results 408 in the middle region 404B, and the images 416 in the bottom region 404C.

As illustrated in FIG. 4, the videos 406 are placed in a prominent position on the SERP 124 even though the query "park battle" does not explicitly indicate user intent to view video. However, the intent classification tool 114 can infer user intent to view video based on the web page results. In this way, the SERP rendering tool 118 can select, size, and place the most relevant search results in the most prominent positions on the SERP 124 in a query independent manner.

Figure 5:
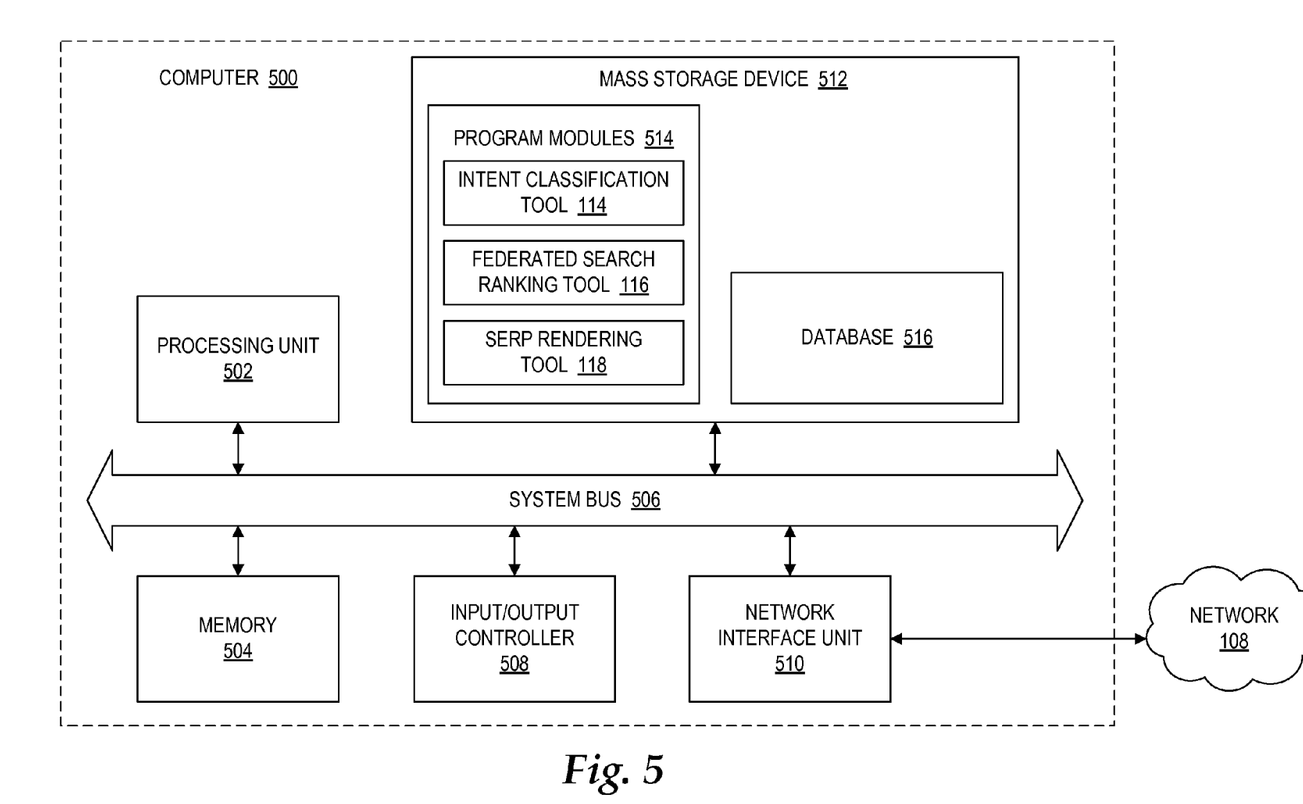
FIG. 5 is a computer architecture diagram showing an illustrative computer hardware architecture for a computing system capable of implementing the embodiments presented herein.

Turning now to FIG. 5, an example computer architecture diagram showing a computer 500 is illustrated. Examples of the computer 500 may include the search engine computer 102, the client computer 104, and the search result providers 106. The computer 500 may include a central processing unit ("CPU") 502, a system memory 504, and a system bus 506 that couples the memory 504 to the CPU 502. The computer 500 may further include a mass storage device 512 for storing one or more program modules 514 and a database 516. Examples of the program modules 514 may include the intent classification tool 114, the federated search ranking tool 116, and the SERP rendering tool 118. The mass storage device 512 may be connected to the CPU 502 through a mass storage controller (not shown) connected to the bus 506. The mass storage device 512 and its associated computer-storage media may provide non-volatile storage for the computer 500. Although the description of computer-storage media contained herein refers to a mass storage device, such as a hard disk or CD-ROM drive, it should be appreciated by those skilled in the art that computer-storage media can be any available computer storage media that can be accessed by the computer 500.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as the network 108. The computer 500 may connect to the network 108 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. Similarly, the input/output controller 508 may provide output to a display or other type of output device (not shown).

The bus 506 may enable the CPU 502 to read code and/or data to/from the mass storage device 512 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 514 may include software instructions that, when loaded into the processing unit 502 and executed, cause the computer 500 to place search results on the SERP 124. The program modules 514 may also provide various tools or techniques by which the computer 500 may participate within the overall systems or operating environments using the components, flows, and data structures discussed throughout this description. For example, the program modules 514 may implement interfaces for placing search results on the SERP 124.

In general, the program modules 514 may, when loaded into the processing unit 502 and executed, transform the processing unit 502 and the overall computer 500 from a general-purpose computing system into a special-purpose computing system customized to place search results on the SERP 124. The processing unit 502 may be constructed from any number of transistors or other discrete circuit elements, which may individually or collectively assume any number of states. More specifically, the processing unit 502 may operate as a finite-state machine, in response to executable instructions contained within the program modules 514. These computer-executable instructions may transform the processing unit 502 by specifying how the processing unit 502 transitions between states, thereby transforming the transistors or other discrete hardware elements constituting the processing unit 502.

Encoding the program modules 514 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 514 may transform the physical state of the semiconductor memory, when the software is encoded therein. For example, the program modules 514 may transform the state of transistors, capacitors, or other discrete circuit elements constituting the semiconductor memory.

As another example, the computer-storage media may be implemented using magnetic or optical technology. In such implementations, the program modules 514 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for placing search results on a SERP are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for placing search results on a search engine results page (SERP), the method comprising computer-implemented operations for:
   receiving, through a computer having a memory and a processor, a single query;
   transmitting, through the computer, the query to a plurality of search result providers;
   upon transmitting the query to the plurality of search result providers, receiving, through the computer, a first set of search results and a second set of search results;
   extracting, through the computer, intent features from the first set of search results by extracting correlations and anti-correlations between the first set of search results and user related information;
   inferring, through the computer, user intent of the second set of search results based on the extracted intent features;
   ranking, through the computer, the first set of search results and the second set of search results based on the inferred user intent; and
   rendering, through the computer, the SERP according to the ranked first set and second set of search results.

2. The computer-implemented method of claim 1, wherein extracting, through the computer, intent features from the first set of search results comprises extracting, through the computer, text contained in the first set of search results.

3. The computer-implemented method of claim 2, wherein extracting, through the computer, text contained in the first set of search results comprises extracting, through the computer, single words from the first set of search results.

4. The computer-implemented method of claim 2, wherein extracting, through the computer, text contained in the first set of search results comprises extracting, through the computer, phrases containing two or more words from the first set of search results.

5. The computer-implemented method of claim 2, wherein the text contained in the first set of search results comprises at text from uniform resource locators (URLs), titles, or snippets in the first set of search results.

6. The computer-implemented method of claim 1, wherein extracting, through the computer, intent features from the first set of search results further comprises extracting, through the computer, similarities and differences between the first set of search results from different search result providers.

7. The computer-implemented method of claim 1, wherein extracting, through the computer, intent features from the first set of search results further comprises extracting, through the computer, information known about websites corresponding to uniform resource locators (URLs) in the first set of search results.

8. The computer-implemented method of claim 1, wherein the first set of search results comprise search results having one or more information types; and wherein the second set of search results comprise search results having one or more other information types.

9. The computer-implemented method of claim 1, wherein inferring, through the computer, user intent based on the extracted intent features comprises determining, through the computer, an intent value for each of one or more information types based on the intent features, each of the intent values indicating a relevance of the corresponding information type to the query.

10. The computer-implemented method of claim 9, wherein each of the intent values comprises a binary value indicating whether the corresponding information type is relevant to the query.

11. The computer-implemented method of claim 9, wherein each of the intent values comprises a range indicating a level of relevance between the corresponding information type and the query.

12. The computer-implemented method of claim 9, wherein ranking, through the computer, the first set of search results and the second set of search results based on the inferred user intent comprises:
   assigning, through the computer, a higher rank for search results in the second set of search results that are relevant to the query according to the intent value; and
   assigning, through the computer, a lower rank for search results in the second set of search results that are not relevant to the query according to the intent value.

13. The computer-implemented method of claim 1 and further comprising:
   generating a classification model through a machine learning technology; and
   wherein inferring user intent based on the extracted intent features comprises inferring user intent based on the extracted intent features according to the classification model.

14. A computer system, comprising:
   a processor;
   a memory communicatively coupled to the processor; and
   a search application (i) which executes in the processor from the memory and (ii) which, when executed by the processor, causes the computer system to place search results on a search engine results page (SERP) by
      receiving a single query,
      transmitting the query to a plurality of search result providers,
      upon transmitting the query to the plurality of search result providers, receiving a first set of search results having one or more information types and a second set of search results having one or more other information types,
      extracting intent features from the first set of search results,
      inferring user intent of the second set of search results based on the extracted intent features,
      ranking the first set of search results and the second set of search results based on the inferred user intent by validating correlations and anti-correlations between features in the first set of search results and the second set of search results, and
      rendering the SERP according to the ranked first set and second set of search results.

15. The computer system of claim 14, wherein the information types include web page results, map results, news results, video results, image results, stock quote results, commerce results, or local search results.

16. The computer system of claim 14, wherein the search application, when executed by the processor, further causes the computer system to place search results on the SERP by generating a classification model through a machine learning technology; and wherein inferring user intent based on the extracted intent features comprises inferring user intent based on the extracted intent features according to the classification model.

17. A computer-readable storage medium having computer-executable instructions stored thereon which, when executed by a computer, cause the computer to:
   receive a single query;
   transmit the query to a plurality of search result providers;
   upon transmitting the query to the plurality of search result providers, receive a first set of search results having one or more information types and a second set of search results having one or more other information types, the first set of search results comprising web page results, the second set of search results comprising map results, news results, video results, and image results;
   extract intent features from the web page results by extracting correlations and anti-correlations between the web page results and user related information;
   infer user intent of the web page results, the map results, the news results, the video results, and the image results based on the extracted intent features;
   rank the web page results, the map results, the news results, the video results, and the image results based on the inferred user intent; and
   render the search engine results page according to the ranked web pages results, map results, news results, video results, and image results.

\* \* \* \* \*